United States Patent
Anderson et al.

(10) Patent No.: US 9,591,367 B2
(45) Date of Patent: Mar. 7, 2017

(54) METHOD, APPARATUS AND SYSTEM FOR MULTIPLE SCREEN MEDIA EXPERIENCE

(75) Inventors: David Brian Anderson, Florence, NJ (US); Shemimon Manalikudy Anthru, Dayton, NJ (US); Jens Cahnbley, Princeton Junction, NJ (US); David Anthony Campana, Princeton, NJ (US); Ishan Uday Mandrekar, Monmouth Junction, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/008,100

(22) PCT Filed: May 27, 2011

(86) PCT No.: PCT/US2011/038348
§ 371 (c)(1),
(2), (4) Date: Sep. 27, 2013

(87) PCT Pub. No.: WO2012/166094
PCT Pub. Date: Dec. 6, 2012

(65) Prior Publication Data
US 2014/0020025 A1    Jan. 16, 2014

(51) Int. Cl.
*H04N 5/445*    (2011.01)
*H04N 21/4782*    (2011.01)
(Continued)

(52) U.S. Cl.
CPC ..... *H04N 21/4782* (2013.01); *H04N 21/4126* (2013.01); *H04N 21/4307* (2013.01);
(Continued)

(58) Field of Classification Search
CPC ........................ H04N 21/6175; H04N 21/4782
(Continued)

(56) References Cited

U.S. PATENT DOCUMENTS 6,542,882 B1 *    4/2003    Smith ................. G06F 17/3089
706/45
8,793,731 B2 *    7/2014    Anderson .......... H04N 21/4122
725/39
(Continued)

FOREIGN PATENT DOCUMENTS

CA    2720169    5/2008
EP    1659484    5/2006
(Continued)

OTHER PUBLICATIONS

Alexa Internet Inc; Alexa Top 500 Global Sites. http://www.alexa.com/topsites. Accessed May 2010.
(Continued)

*Primary Examiner* — Pankaj Kumar
*Assistant Examiner* — Sahar Baig
(74) *Attorney, Agent, or Firm* — Brian J. Dorini; Robert D. Shedd

(57) ABSTRACT

A current programming channel, and the content thereon, being displayed on a primary display device are tracked. Web content related to the content being displayed on the primary display device is searched and the resulting data is made available to a user on at least one secondary display device via a user interface. The results of the search are made available to a user such that when data resulting from the search is selected for display on the at least one secondary display device, the data is displayed on the at least one secondary display device without interfering with a display of content on the primary display device. In the event of a change of the programming channel or the content thereon, a new search is initiated for data related to content being currently viewed.

20 Claims, 4 Drawing Sheets

(51) Int. Cl.
*H04N 21/61* (2011.01)
*H04N 21/41* (2011.01)
*H04N 21/43* (2011.01)
*H04N 21/462* (2011.01)
*H04N 21/4722* (2011.01)

(52) U.S. Cl.
CPC ..... *H04N 21/4622* (2013.01); *H04N 21/4722* (2013.01); *H04N 21/6175* (2013.01)

(58) Field of Classification Search
USPC .................................................. 725/40, 43
See application file for complete search history.

(56) References Cited

U.S. PATENT DOCUMENTS

| | | | |
|---|---|---|---|
| 2003/0126616 | A1 | 7/2003 | Dewa |
| 2004/0031058 | A1 | 2/2004 | Reisman |
| 2007/0250848 | A1* | 10/2007 | Gorti ............... H04H 20/38 725/14 |
| 2008/0072270 | A1 | 3/2008 | Delegue et al. |
| 2008/0313147 | A1 | 12/2008 | Svore et al. |
| 2009/0100147 | A1 | 4/2009 | Igarashi |
| 2009/0180484 | A1 | 7/2009 | Igarashi |
| 2009/0193469 | A1 | 7/2009 | Igarashi |
| 2009/0235317 | A1 | 9/2009 | Igarashi |
| 2009/0307307 | A1 | 12/2009 | Igarashi |
| 2010/0070360 | A1* | 3/2010 | Gilbert et al. ............. 705/14.19 |
| 2011/0106744 | A1* | 5/2011 | Becker et al. ................. 706/46 |
| 2011/0282906 | A1* | 11/2011 | Wong ............... G06F 17/30831 707/780 |
| 2012/0174155 | A1* | 7/2012 | Mowrey et al. ................ 725/40 |
| 2012/0197857 | A1* | 8/2012 | Huang ............... G06F 3/0488 707/706 |
| 2012/0311640 | A1* | 12/2012 | Cahnbley et al. ............. 725/53 |

FOREIGN PATENT DOCUMENTS

| | | |
|---|---|---|
| EP | 2000917 | 12/2008 |
| EP | 2000918 | 12/2008 |
| EP | 2000919 | 12/2008 |
| EP | 2339767 | 6/2011 |
| JP | 2002133592 | 5/2002 |
| JP | 2003125305 | 4/2003 |
| JP | 2003216609 | 7/2003 |
| JP | 2004312223 | 11/2004 |
| JP | 2005332168 | 12/2005 |
| JP | 2008182574 | 8/2008 |
| JP | 2010239360 | 10/2010 |
| RU | 2008136041 | 3/2010 |
| WO | WO2010090946 | 8/2010 |

OTHER PUBLICATIONS

Cesar Et Al: Usages of the Secondary Screen in an Interactive Television Environment. Proceedings of 6th European Conf. on Changing TV Environments. Austria, Jul. 3-4, 2008.
Cruickshank Et Al: Making Interactive TV Easier to Use:Interface Design for a Second Screen Approach. Design Journal Oct. 3, 2007 pp. 41-53.
Guglielmo: iPad Sales Anyone's Guess as Analysis Skip Estimates. Bloomberg Businessweek. 2010.
Kingsbury: US Smart-Phone Ownership Jumps in Recent Months Dow Jones Newswires. 2010.
Stelter Et Al: Successes (and Some Growing Pains) at Hulu. New York Times, Apr. 1, 2010.
Tskleves Et Al: Bringing the TV Experience to Other Media in the Home: An Ethnographic Study. Proc of 7th Eur.Conf on Eur Interactive TV. Belgium, Jun. 3-5, 2009 (Not yet available).
Twitter Inc: Measuring Tweets. http://blog.twitter.com/2010/02/measuring-tweets.html Feb. 2010 Accessed May 2010.
Wikimedia Foundation : Terms of Use http://wikimediafoundation.org/wiki/Terms_of_Use Accessed May 2010.
Zuckerberg: An Open Letter from Facebook Founder Mark Zuckerberg. Accessed May '10 http://blog.facebook.com/blog.php-?post=190423927130. Dec. 2009.
Search Report Dated Feb. 24, 2012.
Cesar et al., "Usages of the Secondary Screen in an Interactive Television Environment: Control, Enrich, Share, and Transfer Television Content," 6th European Conference on Changing TV Environment, Jul. 3-4, 2008, Lecture notes in Computer Science, Springer Berlin, pp. 168-177, Jul. 3, 2008.
Cruickshank et al., "Making Interactive TV Easier to Use: Interface Design for a Second Screen Approach," Design Journal, Oct. 3, 2007, pp. 41-53.
Guglielmo et al., "IPad Sales Anyone's Guess as Analysts Skip Estimates (Update3)," Business week, Mar. 30, 2010, 4 pages.
Kingsbury et al., "US Smart-Phone Ownership Jumps in Recent Months—ComScore," Dow Jones Newswires, Mar. 10, 2010, 1 page.
Stelter et al., "Successes (and Some Growing Pains) at Hulu," The New York Times, Mar. 31, 2010, 3 pages retrieved from the Internet Sep. 26, 2013.
Well et al., "Measuring Tweets (/2010/measuring-tweets)," Twitter Blogs, Feb. 22, 2010, Retrieved from the Internet at https://blog.twitter.com/2010/measuring-tweets.
Wikimedia Foundation, "Terms of Use," 13 pages, Retrieved from the Internet, accessed May 2010, http://wikimediafoundation.org/Terms_of_Use.
Zuckerberg et al., "An Open Letter from Facebook Founder Mark Zuckerberg," Facebook, Dec. 1, 2009, Retrieved from the Internet, http://blog.facebook.com/blog.php?post=190423927130.
Adcock EtAl: "Interactive Video Search Using Multilevel Indexing"; Proceedings of 4th Int'l Conference CIVR 2005, Singapore; Jul. 20-22, 2005; pp. 1-10.

* cited by examiner

METHOD, APPARATUS AND SYSTEM FOR MULTIPLE SCREEN MEDIA EXPERIENCE

This application claims the benefit, under 35 U.S.C. §365 of International Application PCT/US2011/038348, filed May 27, 2011 which was published in accordance with PCT Article 21(2) on Dec. 6, 2012 in English.

FIELD OF THE INVENTION

The present invention generally relates to media consumption and, more particularly, to a method, apparatus and system for experiencing associated content using multiple screens.

BACKGROUND OF THE INVENTION

Televisions have appeared on the market recently with internet connectivity. In addition, peripheral devices that hook up to televisions and provide on-screen interactivity have also been deployed. Such, interactivity with the internet and peripheral devices on the primary television screen, however, has a number of disadvantages including visual interference with the primary content and awkward interface mechanisms.

In today's market, TV viewers are often surrounded by "second screen" devices such as laptops, netbooks, smartphones, and tablets that feature rich user interface capabilities and internet connectivity. Today, however, these devices are disconnected from the television viewing experience.

SUMMARY OF THE INVENTION

Embodiments of the present invention address the deficiencies of the prior art by providing a method, apparatus and system for multiple screen media experience.

In one embodiment of the present invention, a method for providing a multiple screen media experience that does not interfere with content being viewed on a primary display device includes tracking content being displayed on a primary display device, searching for data accessible via the Internet related to the content being displayed on the primary display device and providing, on at least one secondary display device, access to data found resulting from the search. In various embodiments of the present invention, results of a search and content found as a result of a search selected for display on the at least one secondary display device are displayed on the at least one secondary display device without interfering with a display of content on the primary display device.

In an alternate embodiment of the present invention, an apparatus for providing a multiple screen content experience includes a tuner for receiving and tuning programming content, a processor for tracking content being displayed on a primary display device and a web service for, in conjunction with the processor, searching for data accessible via the Internet related to the content being displayed on the primary display device and making accessible on at least one secondary display device, the data found as a result of the search.

In an alternate embodiment of the present invention a system for providing a multiple screen content experience includes a primary display device for displaying received content, at least one secondary display device for displaying content related to the content being displayed on the primary display device without interfering with a display of content on the primary display device, a web service for providing access to data accessible via the Internet and an apparatus including a tuner for receiving content and a processor for tracking content being displayed on the primary display device and for, in conjunction with the web service, searching for data accessible via the Internet related to the content being displayed on the primary display device and making accessible on the at least one secondary display device, the data found as a result of the search.

BRIEF DESCRIPTION OF THE DRAWINGS

The teachings of the present invention can be readily understood by considering the following detailed description in conjunction with the accompanying drawings, in which:

FIG. 3 depicts a screenshot of an exemplary related content browser interface in a web page format having a tabbed format in accordance with an embodiment of the present invention.

Figure 1:
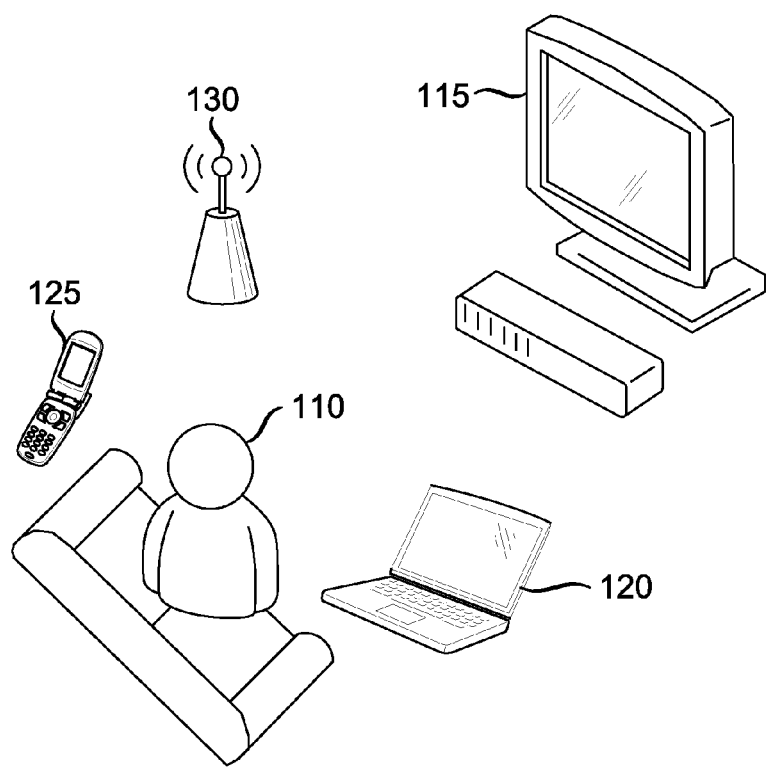
FIG. 1 depicts a high level block diagram of an in-home viewing environment in accordance with the prior art.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

Embodiment of the present invention advantageously provides a method, apparatus and system for multiple screen media experience. Although the present invention will be described primarily within the context of a providing auxiliary content related to main content on a television on a second screen device, the specific embodiments of the present invention should not be treated as limiting the scope of the invention. It will be appreciated by those skilled in the art and informed by the teachings of the present invention that the concepts of the present invention can be advantageously applied to the presentation of main content on any screen device and the presentation of auxiliary content on more than a second screen device.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

FIG. 1 depicts a high level block diagram of an in-home viewing environment in accordance with the prior art. As depicted in FIG. 1, a viewer 110 is consuming television 115 content while being surrounded by additional viewing screens, illustratively a lap top computer 120 and a mobile phone 125, for consuming other content by utilizing internet access via a wireless network 130. In the embodiment of FIG. 1 the consumption experience on each of the screens is separate and disconnected.

Figure 2:
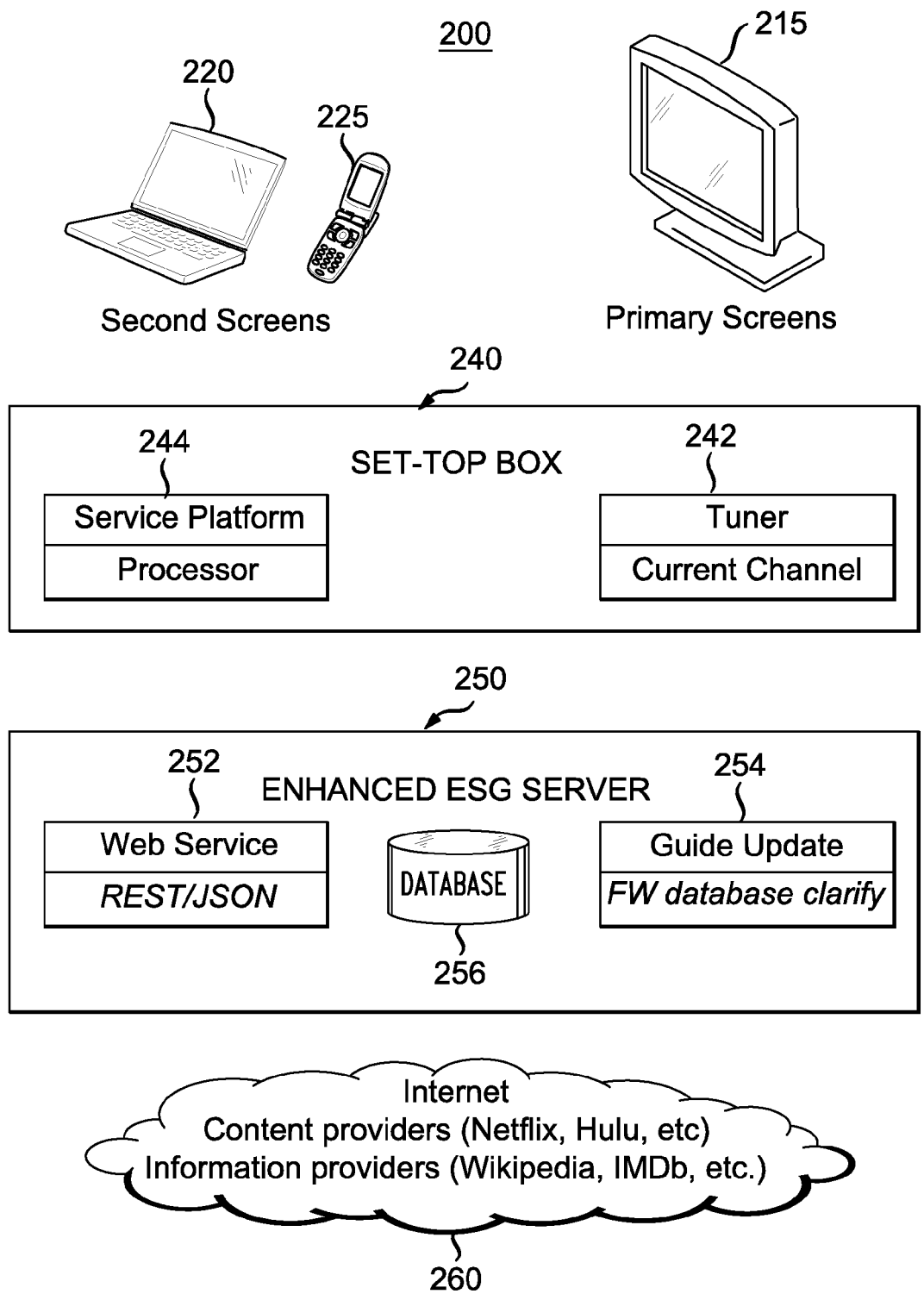
FIG. 2 depicts a high level block diagram of an in-home viewing system in accordance with an embodiment of the present invention.

FIG. 2 depicts a high level block diagram of an in-home viewing system in accordance with an embodiment of the present invention. The system 200 of FIG. 2 illustratively includes a primary screen 215 (illustratively a television), a secondary screen 220 (illustratively a lap top computer), a tertiary screen 225 (illustratively a mobile phone) and a set-top box 240. The set-top box 240 of FIG. 2 illustratively includes a tuner 242 and a processor 244 for executing a service platform for providing a multiple screen media experience in accordance with the concepts of the various embodiments of the present invention described herein.

The set-top box of FIG. 2 further illustratively includes an enhanced electronic service guide (ESG) server 250 including a web service 252 and a guide update process 254 including a database 256. FIG. 2 further illustrates an Internet 260 for intercommunicating information and content with the set-top box 240.

Although, in FIG. 2, the ESG server 250 is depicted as an integrated component of the set-top box 240, in alternate embodiments of the present invention, given the volume of web searches required to locate related data for the secondary screens of the various embodiments of the present invention and the time required to perform these searches, a central server (not shown) containing a complete ESG database is used versus an integrated component of a set-top box as depicted in FIG. 2. A central server of the present invention would perform the required searches for the related data, such as data related to an ESG associated with a program/content being displayed on a main screen, cache the results to a database, and then provide the data to a secondary screen device/service platform running on a set-top box, such as the set-top box 240 of FIG. 2. In such an embodiment, related data/ESG data is exposed over HTTP via a REST/JSON interface. For the database cache, the sqlalchemy database library is used for flexibility of connecting to sqlite or MySQL as database backends. In one such embodiment, the standard ESG is downloaded overnight for each day and used to perform the web searches to populate enhanced ESG data as described below.

In the various embodiments of the present invention, multiple screen devices 215, 220, 225 are used to provide an enhanced television viewing experience. In one embodiment, the set-top box 240 is utilized to provide services and access content accessible to the multiple screen devices 215, 220, 225. The multiple screen devices 215, 220, 225 of the present invention provide displays for viewing information and additional content without obscuring primary television screen content. The secondary screen devices 220, 225 outside of the primary screen device 215 can also provide user interface opportunities via mouse, keyboard, touch screen, etc. A primary program (e.g., a television channel) is displayed on a primary screen and content related to or associated with the primary program is made available to the user on a secondary screen, in one embodiment, via a web interface, such as the web service 252 of FIG. 2, which can be customized to take advantage of second screen device characteristics.

In recent years, set-top boxes have become more sophisticated featuring fast general purpose processors, large hard drives (for storing DVR content), advanced operating systems, and network connectivity. Optimal integration between primary and secondary screen devices requires access to the available channel lineup, electronic service guide, currently tuned channel, and tuning/playback capabilities—all offered by set-top boxes as part of their central functionality.

In the various embodiments of the present invention, the set-top box is aware of what program is currently tuned, can tune to different programs, has access to the electronic service guide (ESG) applicable to a user's available programming, and has a processor, a memory, and network connectivity capabilities approaching that of desktop computers as described above with reference to the embodiment of FIG. 2. As depicted in the embodiment of FIG. 2, by embedding web server capabilities in the set-top box 240, the capabilities of the various embodiments of the present invention can be made available to off-the-shelf second screen devices on a home network of the present invention via HTTP using, in one embodiment, standard web programming paradigms such as HTML/Javascript and REST/JSON as depicted in FIG. 2. A factor that can affect the effectiveness of the various embodiments of the present invention is the quality of data available to a user and, as such, the system of the embodiment of FIG. 2 includes an ESG server 250 containing a database 256 of program information enhanced by web content accessed via the web service 252.

For example, the web is filled with vast information about television programming but today this experience is disconnected for the user. In current systems, in order to retrieve information on the web/Internet, a user must determine what program they are currently viewing, open a web browser, type in appropriate information for a search, and then manually work through the search engine results to find relevant information. In various embodiments of the present invention, a user viewing experience is improved by automating the search for content on the web/Internet. In one embodiment of the present invention, a user is provided with a local network URL that connects to a web server running on the set-top box. Connecting to this URL initiates a search for related content on the web/Internet based on the current channel and program being viewed. In such an embodiment of the present invention, the user is presented with an HTML page that displays the results of the search.

In various embodiments of the present invention, a current programming channel and the content thereon is tracked such that when the user changes the channel or the content being displayed on a channel changes, the HTML page is automatically refreshed with related content for the program currently being viewed. The user thus has immediate access to a variety of web content sources related to the current program such as an official web site if available, Wikipedia page, Internet Movie Database (IMDb) page, streaming content providers, web images, Twitter discussions and the like.

Figure 3:
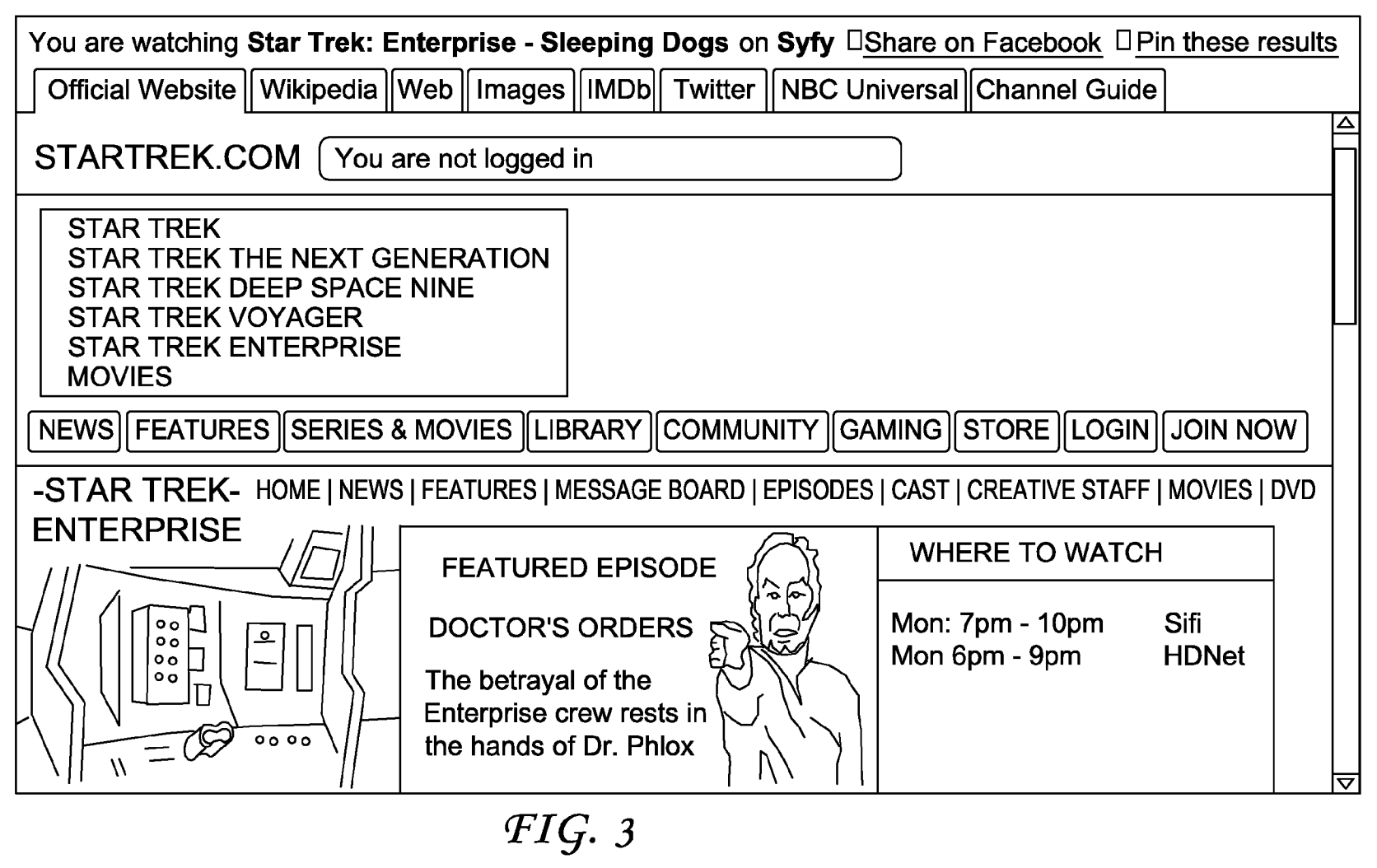

In one embodiment of the present invention, related/associated content results are displayed in a web page with a tabbed format—a familiar user interface paradigm. For example, FIG. 3 depicts a screenshot of an exemplary related content browser interface in a web page format having a tabbed format in accordance with an embodiment of the present invention. As depicted in FIG. 3, a secondary screen can be used to provide a user with access to information related to a program being watched on a primary screen. In the embodiment of FIG. 3, the content being viewed on a primary screen is Star Trek, Enterprise, Sleeping Dogs on the SyFy channel. FIG. 3 depicts the related available content on a secondary screen in a web page with a tabbed format. As depicted in FIG. 3, access to an official web site, StarTrek.com, is made available on a secondary screen and further access to Wikipedia, the Web, related images, IMDb, Twitter, an associated network (illustratively NBC Universal), and a channel guide. In the embodiment of FIG. 3, a user is given an icon to share the information received on a social network such as Facebook. As depicted in FIG. 3, other available related information can be accessed using such tabs as news, features, series and movies, library, community, gaming and access to stores for purchasing related goods.

In alternate embodiments of the present invention related information can be presented to a user in a 'screensaver' mode whereby the related content areas are automatically iterated through for display to the user as a slideshow. Such display modes emphasize active versus passive information consumption. As opposed to prior art solutions, embodiments of the present invention provide a user a non-linear approach to content/guide exploration. Secondary screen capabilities of various embodiments of the present invention provide a non-linear approach to guide content that can exploit the state of the art in clustering algorithms and data visualization. In contrast, conventional on-screen guide involves a simple linear listing of programs in a two-dimensional grid with channel and time as axes. Such a guide is common given the ease of implementation and ease of navigation by remote. The information included in typical electronic service guide data is limited and includes only the information required for on-screen television display such as title, subtitle, a brief description, category/genre, content rating, top credits for some programs, and schedule information (time and channel). This data satisfies the requirements of the typical linear program guide and allows for simple search by name or category but is suboptimal for the enhanced display and interface capabilities of the various embodiments of the present invention.

In accordance with an embodiment of the present invention, an ESG is augmented with data that is obtained from the Internet using, for example, web searches. For example, Table 1 below compares examples of information offered by standard ESG data versus data that is located and displayed in accordance with an embodiment of the present invention in an exemplary enhanced ESG.

TABLE 1

| Standard ESG | Enhanced ESG |
| --- | --- |
| Title | Representative Images |
| Subtitle | Official Website |
| Channel | Extended Description |
| Start Time/End Time | Extended Cast/Credits |
| | 3rd party streaming |

TABLE 1-continued

| Standard ESG | Enhanced ESG |
| --- | --- |
| Description | providers |
| New/Repeat | Netflix, Hulu, etc. |
| Broadcast | 3rd party physical |
| Technical | media |
| Stereo, HD, | Netflix, Amazon, |
| CC, etc. | etc. |
| | 3rd party information |
| Series/Episode Info | providers |
| Content | Wikipedia, IMDb, |
| Rating/Advisories | etc. |
| Critic Rating | Web Search Results |
| | Web Image Search |
| Category/Genre | Results |
| Cast/Credits | User Ratings/Reviews |

In various embodiments of the present invention, to populate the enhanced ESG, web service interfaces from various third parties can be used. In one embodiment, Google and Bing, which offer REST-based search interfaces that simplify the process of locating information on the web, are used. In such an embodiment of the present invention, a heuristics-based approach is taken both in formatting search queries based on program information and in interpreting the quality of the results. In addition, Wikipedia and IMDb are well-known information sources and, as such, related content/programs can be searched for on such sites.

In various embodiments of the present invention, an attempt is made to locate an official web site for a main content/program being viewed or for information related to the main content/program. In many cases, such information can be pulled from Wikipedia data for a program and, if not, an attempt is made to identify an official site through the search interfaces. In order to maximize search results, in one embodiment a fallback mechanism is employed by which narrow program searches are attempted first followed by progressively wider searches. For example, in the case of an episode of a television series, the specific episode is first searched for and, if not found, the search is broadened to the specific series and, if not found, the search is broadened to the television channel that the episode is airing on. Such a search model improves the user experience by ensuring that in most cases some related content for a given program is available on the secondary screen. The inventors have determined that a high availability of web information is available for a given program using the fallback approach of the present invention. For example, table 2 gives search results of web information coverage for 2,080 programs in an ESG from a day's worth of programming from a local cable provider.

TABLE 2

| | Wikipedia | IMDb | Official Website |
| --- | --- | --- | --- |
| Count | 2,071 | 1,549 | 1,966 |
| % | 99.6% | 74.5% | 94.5% |

As evident from the results displayed in Table 2, Wikipedia is an ideal source of data. Wikipedia's open, collaborative approach results in broad coverage of topics as shown by a high rate of success in finding related content on Wikipedia. Additionally, the data at Wikipedia is licensed under the Creative Commons license allowing the data to be freely shared and adapted. Finally, from an implementation standpoint, Wikipedia provides an 'Infobox' mark-up extension that allows for simple parsing of a variety of common data attributes that are desired for the enhanced ESG of the present invention.

In various embodiments of the present invention, links to available streaming content are searched to provide related content to a user. That is, users often wish to view streaming content when searching the web for content, such as television programming. For example, according to ComScore, Hulu, a popular American television streaming site, delivered 903 million video streams in the month of January 2010. Additional sources of streaming television content include Fancast.com, available to Comcast cable subscribers, and Netflix InstantWatch, available to Netflix subscribers. Table 3 shows the streaming content coverage for such services for a sampling of 1,612 programs from a day's worth of ESG data from a local cable provider (sports, news, and shopping omitted as they are unlikely to be available on these services).

TABLE 3

|       | Fancast | Hulu | Netflix | Any   |
|-------|---------|------|---------|-------|
| Count | 214     | 136  | 9       | 254   |
| %     | 13.3%   | 8.4% | 0.6%    | 15.8% |

Media consumption activities, such as television viewing, are a common theme of social networking messages and it is a reasonable assumption that users often post from alternative screen devices while consuming television content.

In an embodiment of the present invention, social networking is implemented to enable a user of a secondary screen device as described herein to communicate via such social networking services for purposes of sharing the user's opinions or to search for related information/content using the social network. That is, social networking services allow internet users to share their thoughts with their family, friends, and the general internet community. Among the popular social networking services are Facebook, reporting 350 million users as of December 2009 and an Alexa Traffic Rank of 2 in both global and US popularity, and Twitter, reporting 50 million "tweets" per day as of February 2010. As depicted in the embodiment of FIG. 3, a tab/link is provided for enabling a user to connect to a social networking service as described above. In addition and as also depicted in the embodiment of FIG. 3, a tab/link is provided for enabling a user to connect to connect/interact with Twitter such that a stream of Twitter "tweets" matching search terms related to the current program can be accessed and displayed.

In one embodiment of the present invention, for the front-end TV interface application, Windows Media Center running on Microsoft Windows and MythTV running on Linux were both implemented. Both applications offer TV tuning capability, service guide, remote control support, plug-in support, attractive design, and user interfaces resembling a set-top box interface. Upon evaluating these applications, both proved to be fairly simple to interface with so it was decided to support both environments in such a system given the advantage of maintaining flexibility in terms of hardware and integration potential with existing systems. In the embodiment described above, the Python programming language and the Pylons web application framework were selected as the web platform for this embodiment of the invention. Advantages included portability between Windows and Linux, rapid development capabilities, vast library support, and the ability to offer both HTML presentation and REST/JSON web services.

In various embodiments of the present invention, in order to support a wide variety of second screen devices that differ greatly in display size and interface mechanisms, data is fed to a rendering mechanism/processor that may be customized for specific devices. For example, in one experimental embodiment of the present invention, data is rendered to a HTML browser format and to a smartphone interface that offers a compact, touch-friendly interface. In such an embodiment, a lower level REST/JSON is also supported for future interoperability with devices supporting native and/or Flash applications.

Figure 4:
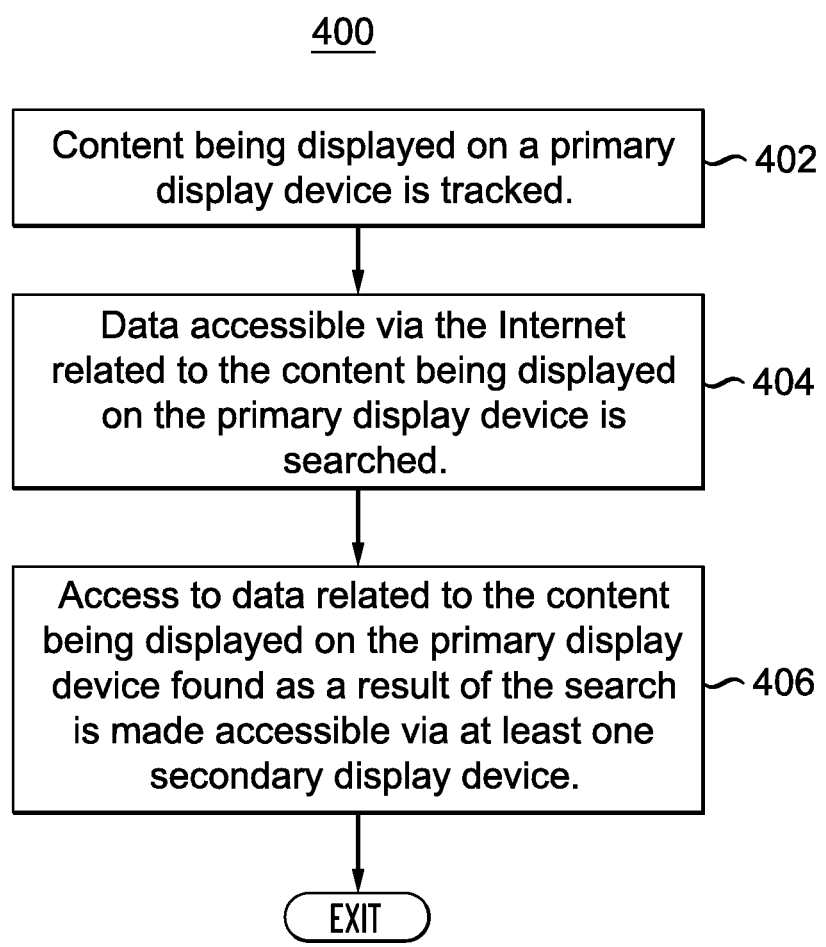
FIG. 4 depicts a flow diagram of a method for multiple screen content viewing in accordance with an embodiment of the present invention.

FIG. 4 depicts a flow diagram of a method for multiple screen content viewing in accordance with an embodiment of the present invention. The method 400 of FIG. 4 begins at step 402 during which content being displayed on a primary display device is tracked. For example, in one embodiment of the present invention, a channel on which the content is being viewed is tracked and the program being presented on the channel is tracked. The method 400 then proceeds to step 404.

At step 404, data accessible via the Internet related to the content being displayed on the primary display device is searched. For example, in one embodiment of the present invention, a search is performed by providing a user with a local network URL that connects to a web server which, upon connection to the local network URL, initiates a search for data related to the content being displayed on the primary display device based on a current channel and program being displayed on the primary display device. The method 400 then proceeds to step 406.

At step 406 access to data related to the content being displayed on the primary display device found as a result of the search is made accessible via at least one secondary display device. For example, in one embodiment of the present invention, after a search is performed, the results of the search can be made available to a user via a user interface as described in the embodiments presented above. That is, a user can be presented a user interface including links to data related to current content being displayed on the primary display device that were found as a result of the search. The method 400 can then be exited.

Having described various embodiments for a method, apparatus and system for multiple screen media experience (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A method for providing information related to content being displayed on a primary display device on at least one secondary display device, comprising:
tracking content being displayed on the primary display device;
searching for information accessible via the Internet related to the content being displayed on the primary display device and, responsive to the information not being found, using a multi-level search by performing a first narrow search directed to a specific episode of a video program series represented by the content being displayed and, responsive to information related to the episode not being found, following the first narrow search by progressively wider searches if necessary to find information relevant to the content being displayed, wherein the progressively wider searches include a second search broader than the first search and directed to the video program series, and a third search broader than the second search and directed to a content provider that provides the episode; and providing, on the at least one secondary display device, access to the information found as a result of said search.

2. The method of claim 1, wherein the access to information is provided via links to information related to the content being displayed on the primary display device.

3. The method of claim 2, wherein said links are automatically determined and presented to a user.

4. The method of claim 1, wherein said search is performed by providing a user with a local network URL that connects to a web server which, upon connection to the local network URL, initiates a search for information related to the content being displayed on the primary display device based on a current channel and program being displayed on the primary display device.

5. The method of claim 1, wherein results of a search represent an enhanced electronic service guide.

6. The method of claim 1, wherein said search is accomplished via REST-based search interfaces.

7. The method of claim 1, wherein a current programming channel of the content being displayed and the content thereon is tracked such that when the programming channel is changed or the content on the channel changes a new search is initiated for information related to content being currently viewed.

8. The method of claim 1, wherein said information accessible via the Internet includes web content sources related to content being displayed on the primary display including at least one of an official web site, a Wikipedia page, an Internet movie database page, streaming content providers, web images, and Twitter discussions.

9. The method of claim 1, wherein results of said search are presented using a web page having a tab format.

10. The method of claim 1, wherein results of said search are presented using a slideshow format.

11. The method of claim 1, wherein information selected for display on the secondary display device is displayed on the secondary screen device without interfering with a display of content on the primary display device.

12. An apparatus for providing information related to content being displayed on a primary display device on at least one secondary display device, comprising:

a tuner for receiving and tuning programming content;

a processor for tracking content being displayed on the primary display device;

a web service for, in conjunction with said processor, searching for information accessible via the Internet related to the content being displayed on the primary display device and, responsive to the information not being found, using a multi-level search by performing a first narrow search directed to a specific episode of a video program series represented by the content being displayed and, responsive to information related to the episode not being found, following the first narrow search by progressively wider searches if necessary to find information relevant to the content being displayed, wherein the progressively wider searches include a second search broader than the first search and directed to the video program series, and a third search broader than the second search and directed to a content provider that provides the episode, and making accessible on at least one secondary display device, the information found as a result of said search.

13. The apparatus of claim 12, further comprising a database for storing at least the results of said search.

14. The apparatus of claim 12, wherein said processor and web service comprise a centralized interfacing platform that interacts with said at least one primary display device and said at least one secondary display device; wherein the centralized interfacing platform retrieves information related to content displayed on the primary display device and transmits it to the secondary display device.

15. A system for providing information related to content being displayed on a primary display device on at least one secondary display device, comprising:

a primary display device for displaying received content;

at least one secondary display device for displaying content related to said content being displayed on the primary display device without interfering with a display of content on the primary display device;

a web service for providing access to information accessible via the Internet; an apparatus comprising: a tuner for receiving content; and a processor for tracking content being displayed on the primary display device and for, in conjunction with said web service, searching for information accessible via the Internet related to the content being displayed on the primary display device and, responsive to the information not being found, using a multi-level search by performing a first narrow search directed to a specific episode of a video program series represented by the content being displayed and, responsive to information related to the episode not being found, following the first narrow search by progressively wider searches if necessary to find information relevant to the content being displayed, wherein the progressively wider searches include a second search broader than the first search and directed to the video program series, and a third search broader than the second search and directed to a content provider that provides the episode, and making accessible on said at least one secondary display device, the information found as a result of said search.

16. The system of claim 15, wherein said information resulting from said Internet search is presented on said at least one secondary display device via a user interface.

17. The system of claim 16, wherein said user interface comprises a web page having a tab format.

18. The system of claim 16, wherein said user interface comprises a web page having a slideshow format.

19. The system of claim 16, wherein said primary display device and said at least one secondary display device comprise at least one of a television screen, a laptop computer, a desktop computer, a net-book, a smart-phone, and a tablet.

20. The method of claim 1, wherein the multi-level search comprises a first search directed to a specific episode of a program represented by the content being displayed, a second search directed to the program represented by the content being displayed, and a third search directed to a content provider that provides the content being displayed.

* * * * *